March 20, 1962  K. F. FRIEDRICH  3,026,466
ELECTRIC POWER TRANSLATION SYSTEM
Filed Nov. 21, 1958  2 Sheets-Sheet 2
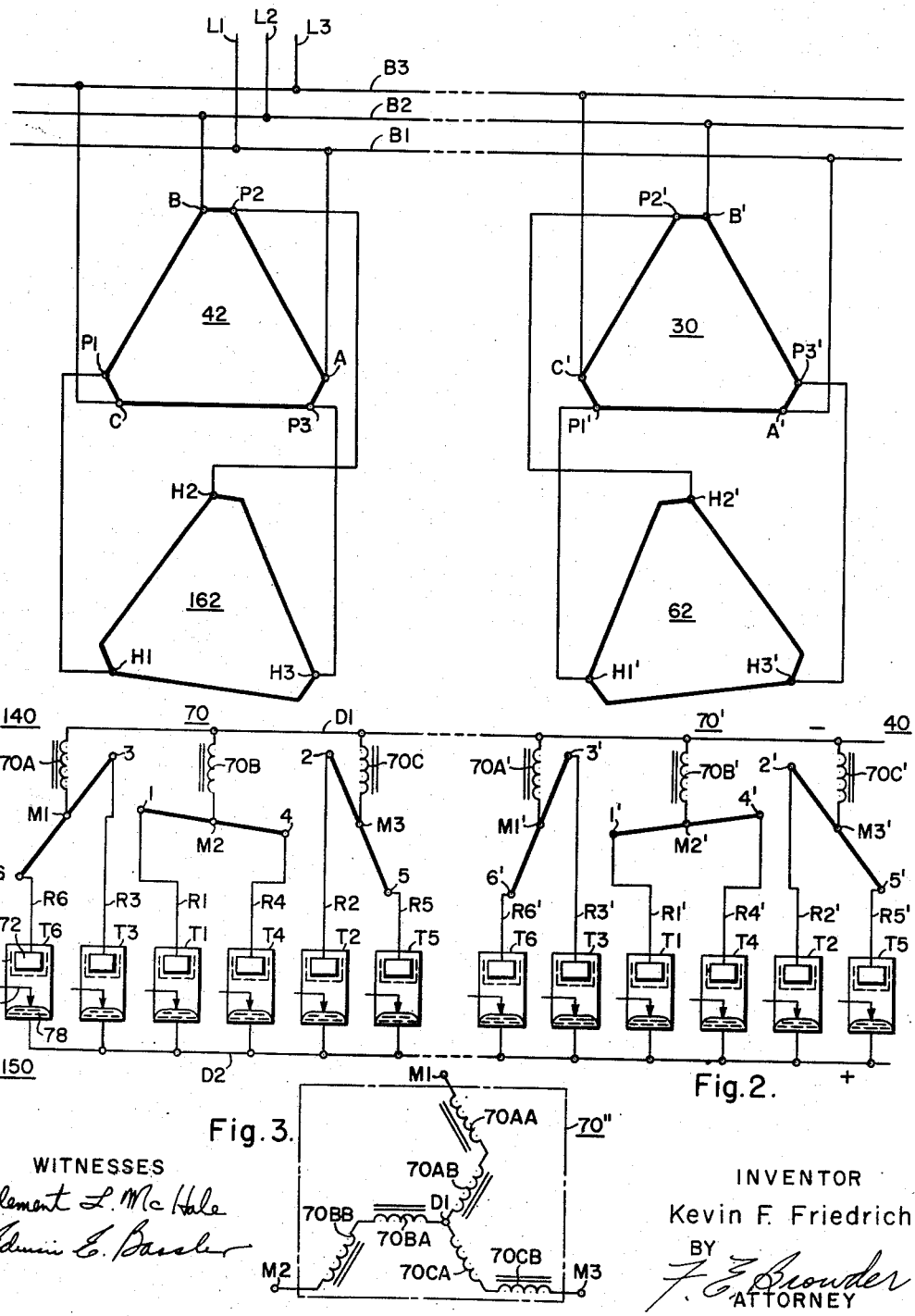
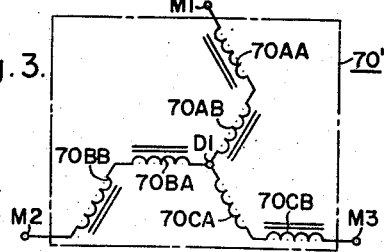
WITNESSES
Clement L. McHale
Edwin E. Bassler
INVENTOR
Kevin F. Friedrich
BY
F. E. Browder
ATTORNEY United States Patent Office 3,026,466
Patented Mar. 20, 1962

3,026,466
ELECTRIC POWER TRANSLATION SYSTEM
Kevin F. Friedrich, Sharon, Pa., assignor to Westinghouse Electric Corporation, East Pittsburgh, Pa., a corporation of Pennsylvania
Filed Nov. 21, 1958, Ser. No. 775,431
13 Claims. (Cl. 321—5)

This invention relates to electric power translation systems of the type in which a plurality of asymmetrically-conducting devices are used to interchange power in one direction or the other between a first polyphase system and a second system which may be either a direct current system or an alternating current system having a frequency which is different from the first polyphase system.

In certain types of conventional electric power translation systems, such as rectifier circuits, including a plurality of rectifier units connected in parallel, it is desirable to provide a relatively large number of rectifier phase voltages in order to obtain more desirable operating characteristics. For example, one advantage of providing a large number of phases in such a system is that associated power generating equipment, such as generators, in an electrical power system need be effectively derated to a lesser extent. There are several conventional methods for increasing or multiplying the number of phases in an overall rectifier system. One method commonly employed is to provide phase shifting means, such as phase shifting transformers, which are connected in circuit relation with associated rectifier transformers to introduce different phase shifts into the output voltages of each of a plurality of parallel connected transformers to thereby increase the number of phases in the overall rectifier system.

The required phase angle shift introduced by each of the phase shifting transformers in a rectifier system of the type described may be quite large in a particular application and the phase shifting transformers in such applications have the disadvantages of being quite large in physical size and rather difficult to design. In order to reduce the phase angle shift required in certain applications, one conventional method involves the use of a plurality of rectifier transformers half of which include delta connected primary windings and half of which include Y connected primary windings to reduce the required phase angle shift in the associated phase shifting transformers. A disadvantage of the latter method is that in certain conventional rectifier circuits of this type, it is necessary to provide a delta connected tertiary winding on a rectifier transformer which includes a Y connected primary winding. The necessity for a tertiary winding on a transformer increases the equivalent k.v.a. rating and the associated losses of such a rectifier transformer.

An example of a rectifier circuit in which the rectifier transformer must include a delta connected primary winding or include a tertiary winding provided for neutral stabilization is disclosed in U.S. Patent No. 2,825,022, issued Feb. 25, 1958, on application of J. L. Boyer et al. and assigned to the assignee of the present application. The rectifier circuit disclosed in said patent is of a type which is uniquely adapted for use with certain asymmetrically-conducting devices, such as semiconductor rectifiers and large ignitrons, in which the rating is determined more by the peak current rather than by the average current carried by each of said devices. In order to take greater advantage of the current carrying capacity of such devices, it is desirable that a rectifier circuit or system be provided in which each of said devices has a lower peak current and also conducts for longer periods during each cycle of the alternating current electric power interchanged in such a system. It is also desirable in a translation system of the type described, which is used to convert a polyphase alternating current to a unidirectional current, that the alternating current applied to associated asymmetrically conducting devices include a larger plurality of phases in order to obtain a smoother unidirectional current at the output of the translation system. Further, it is desirable that the phase angle shift required in phase shifting transformers included in a translation system of the type described be held to a minimum.

It is an object of this invention to provide a new and improved electric power translation system.

It is another object of this invention to provide a new and improved connection arrangement between a transformer means and a plurality of asymmetrically-connecting devices in a translation system for electric power.

A further object of this invention is to provide a new and improved electric power translation system which includes a plurality of transformers and associated phase shifting means with the plurality of transformers arranged to reduce the phase angle shift required in the associated phase shifting means.

A more specific object of this invention is to provide an electric power translation system having a multiple phase output and including a plurality of transformers divided into pairs with the primary windings of each pair arranged to introduce a phase angle shift into the output voltage of each of said transformers in opposite directions to reduce the phase angle shifts required in associated phase shifting transformers.

A final object of this invention is to reduce the phase angle shift of the phase shifting means in an electric power translation system having a relatively large number of phases at the output without requiring a tertiary winding on the transformers included in the translation system.

Other objects of the invention will in part be obvious and will in part appear hereinafter.

For a fuller understanding of the nature and objects of the invention, reference should be had to the following detailed description, taken in connection with the accompanying drawing, in which:

FIG. 2 is a schematic diagram of parts of the apparatus shown in FIG. 1 in block form; and FIG. 3 is a schematic diagram illustrating an alternate form of the interphase reactance means shown in FIG. 2.

Figure 1:
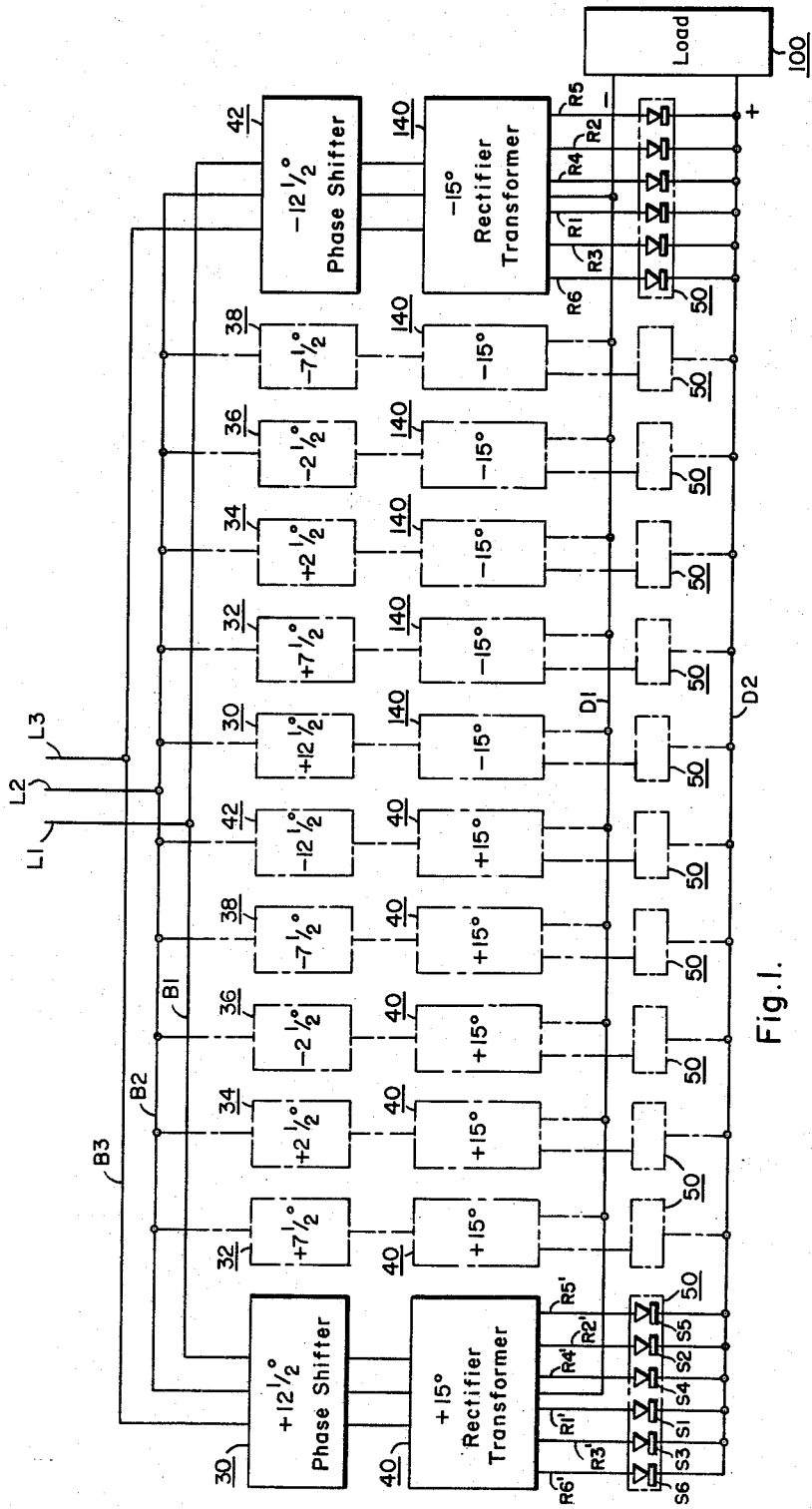
FIG. 1 is a schematic diagram in block form of an electric power translation system illustrating one embodiment of the invention.

Referring now to the drawings and FIG. 1 in particular, there is shown in general, an electric power translation system illustrating one embodiment of the invention. More specifically, there is illustrated an electric power translation system of the type in which power is taken from a three phase power supply system including the power leads L1, L2 and L3 and is transmitted through a plurality of asymmetrically-connecting devices to a unidirectional current circuit having power leads D1 and D2, to which is connected a load 100. The invention will be described as if the power is transferred from the three phase power leads L1, L2 and L3 to the unidirectional current power leads D1 and D2, but it is to be understood that by the use of well known inverter control connections, the direction of power flow could be reversed. The unidirectional current power leads D1 and D2 will be described as if they were a direct current power system which receives power from the three phase power system at L1, L2 and L3, but it is to be understood that unidirectional current power leads could be either the anode terminal circuit of one phase (or the phase) of a second different frequency alternating current system which receives power from or which transmits power to the three-phase power system at L1, L2 and L3, provided that suitable rectifier controlling means are provided.

The electric power translation system shown in FIG. 1, more specifically the rectifier system, comprises a plurality of phase shifting means, a plurality of associated rectifier transformers and a plurality of groups of asymmetrically-conducting devices connected in circuit relation to provide a unidirectional current output based on 72 phase rectifier operation.

The translation system shown in FIG. 1 includes twelve phase shifting means each arranged to introduce a predetermined phase angle shift between the voltage at the three-phase power leads L1, L2 and L3 which are connected to the corresponding bus conductors B1, B2 and B3, respectively, and the voltage applied at the input of each of the associated rectifier transformers. Each of the phase shifting means 30 introduces a phase angle shift of substantially $+12\frac{1}{2}°$, and the shifting means 32, 34, 36, 38 and 42 each introduces a phase angle shift of $+7\frac{1}{2}°$, $+2\frac{1}{2}°$, $-2\frac{1}{2}°$ and $-12\frac{1}{2}°$, respectively. The twelve rectifier transformers associated with the twelve phase shifting means just described are divided into two groups of six transformers 40, each introducing an additional phase angle shift between the voltage at the input of each of said transformers and the voltage at the output of each of said transformers of substantially $+15°$ with respect to the voltage at the three-phase power leads L1, L2 and L3. The other six rectifier transformers 140 each introduces an additional phase angle shift of substantially $-15°$ with respect to the voltage at the three-phase power leads L1, L2 and L3.

The twelve rectifier transformers, which includes the six transformers 140 and the six transformers 40, may be divided into six pairs of transformers, each including a transformer 40 and a transformer 140 which are both connected to associated phase shifting means having the same phase angle shift associated with said phase shifting means. For example, there is a transformer 40 and a transformer 140 each connected to a phase shifting means 30, which introduces a phase angle shift of $12\frac{1}{2}°$ with respect to the voltage at the three-phase power leads L1, L2 and L3 at the input of the associated transformer. The other phase shifting means 32, 34, 36, 38 and 42 and the associated rectifier transformers 40 and 140 may be similarly divided into pairs. The rectifier transformer 40 connected to the phase shifting means 30 produces at the output rectifier leads R1' through R6', six rectifier phase voltages which are applied to the associated group 50 of the semiconductor rectifying devices S1 through S6, respectively, for providing a first six-phase output at the unidirectional power leads D1 and D2. The associated rectifier transformer 140 also connected to the phase shifting means 30 also produces six rectifier phase voltages at its output which are displaced in phase from the output of the associated rectifier transformer 40 by an angle of substantially 30° because of the relative phase angle shifts of opposite directions with respect to the power leads L1, L2 and L3 which are introduced by the pair of transformers 40 and 140 which are connected to the phase shifting means 30. Similarly, the rectifier transformer 140 connected to the phase shifting means 42 produces at the rectifier leads R1 through R6, six rectifier phase voltages which are applied to another associated group 50 and which are displaced in phase substantially 30° from the output voltages of the other rectifier transformer 40 of the pair of transformers 40 and 140 which are both connected to a phase shifting means 42. The other rectifier transformers 40 and 140 and their associated phase shifting means 32, 34, 36 and 38, respectively, each provides six rectifier phase voltages to the unidirectional power leads D1 and D2 which are symmetrically displaced in phase from the outputs of the other rectifier transformers to provide total of 72 rectifier phases to the plurality of groups 50, each of said groups including six semiconductor rectifying devices S1 through S6, which are of a type in which the rating is determined more by the peak current than by the average current carried by each of said rectifier devices.

It is to be noted that each pair of the rectifier transformers 40 and 140 introduces a phase angle shift into the output voltages of the respective rectifier transformers which decreases or reduces the required phase angle shift in the associated phase shifting means 30, 32, 34, 36, 38 and 42. For example, if the rectifier transformer 40 connected to the phase shifting means 30 did not include a phase shift or phase rotation of substantially $+15°$, the phase shifting means 30 connected between the transformer 40 and the power leads L1, L2 and L3 would have to be designed for a phase shift of substantially $+27\frac{1}{2}°$ rather than $12\frac{1}{2}°$ as shown. The manner in which the phase angle shift is incorporated into each of the rectifier transformers 40 and 140 of a predetermined angle which is in opposite directions for the transformers 40 and 140, respectively, relative to the voltage at the three-phase power leads L1, L2 and L3 will be explained hereinafter in detail.

In summary, the electric power translation system shown in FIG. 1 includes phase shifting means and a plurality of rectifier transformers for applying to associated groups of asymmetrically-connecting devices, 72 rectifier phase voltages which are symmetrically displaced from each other by substantially five electrical degrees, each pair of the rectifier transformers cooperating with the associated phase shifting means to provide two six-phase output voltages which are separated from each other by substantially 30° or, in other words, each pair of rectifier transformers providing a twelve-phase output voltage. The twelve-phase output voltages of the respective pairs of transformers are then displaced in phase relation from each other by predetermined phase angles as indicated by the various phase shifting means shown in FIG. 1 to produce 72 rectifier phase voltages which are finally applied to the plurality of groups 50 of the semiconductor rectifying devices. As stated previously, the required phase angle shift introduced by each of the phase shifting means 30 through 42 is reduced by the inherent phase shifting characteristic of each of the rectifier transformers 40 and 140, respectively.

Referring now to FIG. 2, there is illustrated in detail the phase shifting means 42 and 30 and the associated rectifier transformers 140 and 40 respectively. As shown, the rectifier transformers 140 and 40 are each interconnected with an associated group 150 of ignitron tubes T1 through T6 which may be substituted for the groups 50 shown in FIG. 1 and which may be taken to be broadly representative of six separate single phase asymmetrically-conducting devices of a type in which the rating of each device is determined more by its peak current than by its average current. Each of the ignitron tubes T1 through T6 comprises a main anode 72, a grid 74 and ignitor 76 and a mercury or other vaporizable cathode pool 78. The six cathode leads of the tubes T1 through T6 are each connected to the positive conductor D2 of the direct current bus. The six anode leads of the tubes T1 to T6 comprise six rectifier leads R1 through R6 respectively, the leads and the tubes being numbered in accordance with the sequence of the phases in a six phase rectifier arrangement.

The phase shifting means 42 and 30 each comprises a conventional, hexagonally connected autotransformer having input terminals A, B and C connected to the three-phase power leads L1, L2 and L3, respectively, through the bus connectors B1, B2 and B3, respectively. The output terminals P1, P2 and P3 of the phase shifting transformer 42 are connected to the input terminals H1, H2 and H3, respectively, of the associated rectifier transformer 40. As well known in the art, the relative portions or turns of the phase windings of the phase shifting transformers 42 and 30 may be varied to obtain a phase angle shift between the voltage applied at the input terminals and the voltage of the output terminals of said phase shifting transformers. For example, the output voltages of the phase shifting transformers 42 and 30 are displaced in phase from the input voltages by phase angles of $+12\frac{1}{2}°$ and $-12\frac{1}{2}°$, respectively. The phase shifting transformer 30 is similar to the phase shifting transformer 42 except that the corresponding references are primed and the windings arranged to produce a phase angle shift in the opposite direction to the direction of the phase angle shift introduced by the phase shifting transformer 42. The other phase shifting transformers or means 32, 34, 36 and 38 are similar to the phase shifting transformers 42 and 30 except for the relative portions or turns of each phase winding of said phase shifting transformers and the corresponding phase angle shift produced by each of said phase shifting transformers, as shown in FIG. 1.

The rectifier transformers 140 and 40 include the hexagonally connected or interconnected primary windings 162 and 62, respectively. The input terminals H1, H2 and H3 and H1', H2' and H3' of the transformers 140 and 40, respectively, are connected to the output terminals of the associated phase shifting transformers 42 and 30, respectively. Each of the rectifier transformers 40 and 140 includes three secondary windings 6—3, 1—4 and 2—5 and 6'—3', 1'—4' and 2'—5', respectively. Each of said secondary windings includes the mid-tap leads M1, M2 and M3 and M1', M2' and M3', respectively. Each of the secondary windings is responsive to the main portion of the associated phase winding of the primary winding of each of the transformers 140 and 40, respectively. For example, the secondary winding 6—3 is responsive to the main portion of the phase winding between the terminals H1 and H2 of the associated primary winding 162.

The connections of the secondary windings of the transformer 140 will be described in detail and it is to be understood that the connections of the secondary windings of the transformer 40 are similar except that the reference numbers are primed. The secondary windings 6—3, 1—4 and 2—5 are connected to the associated ignitron tubes T1 through T6 in a triple diametric connection. The diametrically opposite ends of the secondary winding 6—3 are connected to the associated ignitron tubes T6 and T3, respectively. Similarly, the diametrically opposite ends of the winding 1—4 are connected to the ignitron tubes T1 and T4 respectively, and the ends of the winding 2—5 are connected to the ignitron tubes T2 and T5, respectively. The voltage between the opposite ends of each secondary winding and its associated mid-tap are substantially 180° out of phase. For example, the voltage between the terminal 6 and the mid-tap M1 is 180° out of phase with the voltage between the terminal 3 and the mid-tap M1. Therefore, the secondary windings of the transformer 140 are arranged to produce three biphase voltages which are displaced from each other by substantially 120°. Similarly, the secondary windings of the transformer 40 are also arranged to produce three biphase voltages. The mid-taps M1, M2 and M3 of the secondary windings 6—3, 1—4 and 2—5 respectively are each connected to the negative conductor D1 of the direct current bus through the windings 70A, 70B and 70C, respectively, of an interphase reactance means 70 which is of three-phase construction and Y connected with the neutral point of the Y connected interphase reactance means 70 connected to the negative conductor D1. Similarly, the secondary windings of the transformer 40 are connected at their mid-tap leads M1' through M3' to the negative conductor D1 through a similar interphase reactance means 70'. The interphase reactance means 70 and 70' are each provided to absorb or develop the necessary alternating current voltage differences or ripple voltages to permit the parallel operation of a plurality of rectifier phases.

As explained previously, each pair of rectifier transformers is connected to a phase angle transformer means having the same phase angle shift and is arranged to include a first transformer, shown in FIG. 2 as the transformer 40, and a second transformer, shown in FIG. 2 as the transformer 140. For example, as shown in FIG. 1, a transformer 40 and a transformer 140 are connected to an associated phase shifting means 30 having the same phase angle shift, which is substantially $+12\frac{1}{2}°$. Each pair of the transformers 40 and 140 has the hexagonally connected or interconnected primary windings 62 and 162, respectively, arranged to shift the input voltage applied at each of said transformers by a predetermined phase angle, which is illustrated as being substantially 15°, in opposite directions with respect to the voltage at the power leads L1, L2 and L3. When the phase angle of the voltages applied at the inputs of a pair of transformers 40 and 140 is the same, then the hexagonally connected primary windings of said transformers are arranged so that the six-phase output voltage of each transformer is displaced from the voltage at the power leads L1, L2 and L3 by a predetermined angle, which is substantially 15°, in opposite directions. Therefore, the two six-phase voltages of each pair of the transformers 40 and 140 are displaced from each other by a total phase angle of substantially 13° to produce a total of 12 rectifier phase voltages displaced from each other by substantially 30°. It is to be noted that the physical construction of the rectifier transformers 40 and 140 is substantially the same and that the only difference between the transformers lies in the connections of the several portions which make up each of the phase windings in the primary windings 62 and 162, respectively, of said transformers. Therefore, the commutating reactance of each of the transformers 40 and 140 is substantially the same which eliminates the necessity of matching the reactances of delta and Y rectifier transformers which are often connected in parallel in conventional rectifier circuits.

It is to be noted that the interphase reactance means 70 and 70' are necessary since the rectifier connections described above are such that different rectifier phases, which are energized by the instantaneous voltages of the three-phase power circuit at L1, L2 and L3, are operated in parallel with each other at times so as to simultaneously supply to or receive power from the same unidirectional power circuit or bus.

The interphase reactances 70 and 70' develop the instantaneous voltage differences necessary to permit the parallel operation of two or more rectifier phases having output voltages which do not reach their peaks at the same instant and yet allow independent operation of the parallel rectifier phases. The interphase reactances 70 and 70' are represented as each comprising three phase windings which would be disposed on an associated magnetic core (not shown) and connected in a star or Y arrangement, the neutral point of the Y connected windings being connected to the negative conductor D1 in order to provide a return path for the output currents supplied to the unidirectional current bus at the conductors D1 and D2. The interphase reactance means 70 and 70' will be designed for operation at the second harmonic of the fundamental frequency of the voltage at the power leads L1, L2 and L3.

In actual practice, the interference reactance means 70" shown in FIG. 3 could be substituted for each of the interphase reactances 70 and 70'. Each of the three phase windings of the interphase reactance 70" are divided into two sections 70AA and 70AB, 70BA and 70BB, 70CA and 70CB, respectively, with each pair of sections connected in a zig-zag arrangement to the mid-tap terminals M1, M2 and M3, respectively, and with the neutral point connected to the negative conductor D1. The interphase reactance 70" has the advantage that in operation the magnetomotive forces on each leg of the associated magnetic core (not shown) due to the unidirectional currents which flow in the windings of the interphase reactance 70'' are balanced or substantially add up to zero. The latter operation assumes that the unidirectional currents which flow at the associated mid-tap terminals M1, M2 and M3 are substantially equal.

In general, the connections between each of the transformers 140 and 40, the associated rectifier leads R1 through R6 and R1' through R6', respectively, and the ignitron tubes T1 through T6 in each of the groups 150 may be described as a hexagonal or interconnected delta, six-phase, triple diametric connection. Since three biphase voltages are obtained at the output of each of the transformers 40 and 140 by the latter connection which are separated by an angle of substantially 30° from the output voltage of the associated rectifier transformer of each pair due to the difference in the connections of the hexagonally connected primary windings of the transformers in each pair, a total of six biphase voltages for twelve phase rectifier operation may be provided by connecting each of the diametrically opposite ends of the secondary windings of each pair of rectifier transformers 40 and 140 through one of the rectifier leads R1 to R6 and R1' to R6' to one of the ignitron tubes T1 to T6 of each of the associated groups 150 of ignitron tubes.

The operation of the secondary windings 6—3, 1—4 and 2—5 in the transformer 140 in the interconnected delta, six-phase, triple diametric connection will now be considered. Because of the diametric connection of the secondary windings 6—3, 1—4 and 2—5 of the power transformer 140 through the associated rectifier leads R6 and R3, R1 and R4, and R2 and R5, respectively, to the corresponding ignitron tubes T6 and T2, T1 and T4, and T2 and T5, respectively, three of the latter ignitron tubes would be operating at parallel at any given instant of each voltage cycle of the three-phase power system at L1, L2 and L3. Any voltage differences, existing at the outputs of the three ignitron tubes which are operating in parallel at any given instant will be absorbed by one of the interphase reactances 70 or 70'. The group 150 of the ignitron tubes T1 through T6 connected to the secondary windings of the associated transformer 40 connected to the phase shifting means having the same phase angle shift as the phase shifting means connected to the transformer 140 of the same pair will operate in similar fashion so that at any given instant, six of the twelve ignitron tubes including the two groups 150 connected to each pair of rectifier transformers will be operating in parallel to provide effectively twelve phase rectifier operation. Since at any given instant, three of the six ignitron tubes connected to each transformer operate in parallel, each ignitron tube conducts for 180° for each cycle of the power supply system at L1, L2 and L3. The conduction of six ignitron tubes in parallel for each pair of rectifier transformers will progress in phase sequence in accordance with the reference numbers of the ignitron tubes T1 to T6. As one ignitron tube ceases to conduct the next ignitron tube will begin to conduct so that six of the twelve ignitron tubes connected to each pair of rectifier transformers are always conducting in parallel. In a 72 phase translation system, such as the rectifier circuit shown in FIG. 1, this means that at any given instant substantially 36 of the 72 asymmetrically-connecting devices shown in said system are operating in parallel.

It is to be understood that a translation system as disclosed may include one or more pairs of rectifier transformers 40 and 140 in a particular embodiment. For example, a twelve-phase rectifier system could be provided with one pair of transformers 40 and 140 connected directly to a three-phase power system such as indicated at the leads L1, L2 and L3 without any associated phase shifting means being required. Other rectifier systems including two or more pairs of rectifier transformers 40 and 140 could be provided with suitable changes in the phase shifting means or transformers provided between each pair of rectifier transformers and a polyphase power system, such as the three-phase power system indicated at L1, L2 and L3 in FIGS. 1 and 2. For example, a 24 phase rectifier system could be provided with two pairs of the rectifier transformers 40 and 140 and with four associated phase shifting transformers, two being designed for a phase angle shift of $+7\frac{1}{2}°$ and two being designed for a phase angle shift of $-7\frac{1}{2}°$ or with only two 15° phase shifting transformers. Other rectifier systems in multiples of twelve phases could be similarly provided. In general, the number of phases in a translation system or rectifier system as disclosed would be equal to the number of pairs of rectifier transformers provided times twelve assuming that suitable or appropriate phase shifting means were also provided.

As previously described, the ignitron tubes T1 through T6 may be provided with any suitable ignitor energizing control circuit for energizing the ignitors 76 of the several tubes. As described, each of the ignitron tubes T1 through T6 constitutes a vapor-electric device having a single-phase space current path between an anode means and a cathode means and each vapor-electric device has its own individual cathode means. It is to be understood that the rectifier circuit or translation system as disclosed could be used with any of the well known semiconductor rectifiers, preferably of the type in which the current rating of the rectifier is determined more by the peak current than by the average current carried by each semiconductor rectifier.

In FIG. 1, the asymmetrically-connected devices are each shown by means of a conventional rectifier symbol which is intended to be applicable to any kind of asymmetrically-conducting device. In FIG. 2, the asymmetrically-conducting devices are shown as ignitron tubes. In carrying out this invention, it is contemplated that devices shall preferably be of a type in which the rating is determined more by the peak current rather than by the thermal capacity of the asymmetrically-conducting device. Two examples of such asymmetrically-conducting devices previously mentioned are the ignitron tube and any one of the large number of semiconductor rectifiers and our invention shall be understood as preferably including the use of either one of these two types of rectifiers. Considering the semiconductor rectifiers, the current rating of such rectifiers is commonly established by the maximum peak or fault current which said devices can withstand. In order to obtain sufficient current capacity, such rectifiers are often employed with a plurality of rectifiers connected in parallel in each phase of an overall rectifier system. Since the peak current of a translation system as disclosed is lower than that of a conventional rectifier circuit of the same type, the number of parallel connected semiconductor rectifiers may be reduced in a particular application without reducing the overall current capacity of the complete translation system.

It is to be understood that single phase transformers may be substituted for the polyphase transformers included in a translation system or rectifier circuits as disclosed in a particular application.

It is to be noted that the rectifier transformers included in a translation system as disclosed combine phase shifting with phase multiplication and voltage transformation and as previously mentioned, the physical construction of each of the rectifier transformers in a rectifier system as disclosed is substantially the same except for the interconnections of the different portions of the primary windings of the phase windings in each primary winding of said rectifier transformers.

The apparatus and circuits embodying the teachings of the invention have several advantages. For example, in a rectifier or translation system as disclosed having a relatively large number of phases, the required phase angle shift and size of the phase shifting transformers included in said system, compared with those employed in conventional rectifier circuits, is substantially decreased or reduced without the necessity for additional tertiary windings on the rectifier transformers included in said rectifier system. A second advantage relates to the construction of the rectifier transformer in a translation system as disclosed. Since each phase winding of the hexagonally connected primary windings of the rectifier transformers 40 and 140 includes portions of voltages from at least two of the three phases of the three-phase power system to which the primary winding is connected, any unbalance in the phase voltages from the three-phase system applied at the input of the rectifier transformers will be transmitted to several phase windings of said rectifier transformers. The latter arrangement tends to reduce unbalanced currents which might otherwise result in the different phases at the output of each rectifier transformer and may eliminate the necessity for special load compensating circuits which would be designed to distribute the load current substantially equally among the three biphase rectifier voltages associated with each transformer. Other advantages of a translation system as disclosed relates to the preferred triple diametric connection of the secondary windings of the rectifier transformers 40 and 140. The latter connection results in substantially 180° conduction in each asymmetrically-connecting device in the system and a lower peak current which permits more efficient use of asymmetrically-conducting devices of the type in which the rating is determined more by the peak current than by the average current carried by each of said devices. The latter advantage is particularly important in the application of semiconductor rectifier devices where additional rectifier devices are often required to provide for the higher peak current or fault current which occurs in conventional rectifier circuits of the same type.

It should be noted that the necessity for a tertiary winding in certain parallel connected rectifier units in translation systems, having a relatively large number of phases, arises because of the problem of neutral stabilization. In certain types of conventional rectifier circuits, the primary winding cannot be connected in Y since, during the operation of the rectifier system, the primary neutral might shift and produce erratic operation of the overall rectifier system. For example, the asymmetrically-conducting devices might conduct for 120° or 60° instead of substantially 180° as is normal in a triple diametric rectifier circuit. The latter operation results because of changes in the voltages across particular phases of the rectifier transformers due to shifting of the primary neutral and the corresponding shifting of the neutral in the secondary winding. As previously mentioned, the latter problem is not present in a rectifier system as disclosed since a Y connected primary winding is not necessary in the different rectifier transformers.

Since numerous changes may be made in the above apparatus and circuits, and different embodiments of the invention may be made without departing from the spirit thereof, it is intended that all the matter contained in the foregoing description or shown in the accompanying drawing shall be interpreted as illustrative and not in a limiting sense.

I claim as my invention:

1. An electric power translation system comprising three-phase power leads, unidirectional current power leads, twelve-phase power leads, first and second transformer means connected between said three-phase power leads and said twelve-phase power leads, each of said transformer means including a three-phase primary winding hexagonally-connected to said three-phase power leads and three secondary windings each having a mid-tap lead and diametrically opposite end connections for providing a six-phase voltage output, a plurality of separate, single-phase, asymmetrically-conducting devices of a type in which the rating is determined more by the peak current than by the average current carried by each of said devices, triple diametric connection means for connecting the diametrically opposite end connections of said secondary windings of each transformer means to said twelve-phase power leads and for connecting said devices between said unidirectional current leads and said twelve-phase power leads, said hexagonally-connected primary windings of said transformer means being arranged to shift the six-phase output voltage of each transformer means by a predetermined phase angle in opposite directions to provide a twelve-phase output voltage at said twelve-phase leads and interphase reactance means connected between said mid-tap leads of said secondary windings and said unidirectional leads to permit half of said devices to operate in parallel at all times.

2. An electric power translation system comprising three-phase power leads, unidirectional current power leads, twelve-phase power leads, first and second transformer means connected between said three-phase power leads and said twelve-phase power leads, each of said transformer means including a three-phase primary winding hexagonally-connected to said three-phase power leads and three secondary windings each having a mid-tap lead and diametrically opposite end connections for providing a six-phase voltage output, a plurality of vapor electric devices each having a single-phase space current path and anode means and a cathode means, each of said devices having its own individual cathode means, triple diametric connection means for connecting the diametrically opposite end connections of said secondary windings of each transformer means to said twelve-phase power leads and for connecting said devices between said unidirectional current leads and said twelve-phase power leads, said hexagonally-connected primary windings of said transformer means being arranged to shift the six-phase output voltage of each transformer means by a predetermined phase angle in opposite directions to provide a twelve-phase output voltage at said twelve-phase leads and interphase reactance means connected between said mid-tap leads of said secondary windings and said unidirectional leads to permit half of said devices to operate in parallel at all times.

3. An electric power translation system comprising three-phase power leads, unidirectional current power leads, twelve-phase power leads, first and second transformer means connected between said three-phase power leads and said twelve-phase power leads, each of said transformer means including a three-phase primary winding hexagonally-connected to said three-phase power leads and three secondary windings each having a mid-tap lead and diametrically opposite end connections for providing a six-phase voltage output, a plurality of mercury vapor gas tubes each having a single-phase space current path and anode means and a cathode means, each of said tubes having its own individual cathode means, triple diametric connection means for connecting the diametrically opposite end connections of said secondary windings of each transformer means to said twelve-phase power leads and for connecting said tubes between said unidirectional current leads and said twelve-phase power leads, said hexagonally-connected primary windings of said transformer means being arranged to shift the six-phase output voltage of each transformer means by a predetermined phase angle in opposite directions to provide a twelve-phase output voltage at said twelve-phase leads and interphase reaction means connected between said mid-tap leads of said secondary windings and said unidirectional leads to permit half of said tubes to operate in parallel at all times.

4. An electric power translation system comprising three-phase power leads, unidirectional current power leads, twelve-phase power leads, first and second transformer means connected between said three-phase power leads and said twelve-phase power leads, each of said transformer means including a three-phase primary winding hexagonally-connected to said three-phase power leads and three secondary windings each having a mid-tap lead and diametrically opposite end connections for providing a six-phase voltage output, a plurality of separate, single-phase, semiconductor rectifying devices of a type in which the rating is determined more by the peak current than by the average current carried by each of said devices, triple diametric connection means for connecting the diametrically opposite end connections of said secondary windings of each transformer means to said twelve-phase power leads and for connecting said devices between said unidirectional current leads and said twelve-phase power leads, said hexagonally-connected primary windings of said transformer means being arranged to shift the six-phase output voltage of each transformer means by a predetermined phase angle in opposite directions to provide a twelve-phase output voltage at said twelve-phase leads and interphase reactance means connected between said mid-tap leads of said secondary windings and said unidirectional leads to permit half of said devices to operate in parallel at all times.

5. An electric power translation system comprising three-phase power leads, direct-current power leads, polyphase power leads, a plurality of pairs of transformers connected between said three-phase power leads and said polyphase power leads, each of the transformers of said pairs comprising an interconnected delta three-phase primary winding connected to said three-phase leads and three secondary windings each having diametrically opposite end connections, said primary windings of each pair being arranged to produce across the associated secondary windings two six-phase output voltages each displaced in phase from said three-phase leads by a predetermined angle in opposite directions, means conductively connecting the diametrically opposite end connections of each secondary winding to said polyphase leads, a plurality of separate, single-phase, asymmetrically-conducting devices of a type in which the rating is determined more by the peak current than by the average current carried by each of said devices, said devices being connected between said direct-current leads and said plurality of pairs of transformers in an interconnected, delta, six-phase, triple diametric connection, phase shifting transformers connected between said three-phase power leads and at least one pair of said transformers to shift the output voltages of said pair by a predetermined phase angle to produce across said polyphase leads a voltage having symmetrical phases equal to the number of pairs times twelve and interphase reactance means connected in circuit relation with said secondary windings to permit a plurality of said devices to operate in parallel at all times.

6. An electric power translation system comprising three-phase power leads, direct-current power leads, polyphase power leads, a plurality of pairs of transformers connected between said three-phase power leads and said polyphase power leads, each of the transformers of said pairs comprising an interconnected delta three-phase primary winding connected to said three-phase leads and three secondary windings each having diametrically opposite end connections, said primary windings of each pair being arranged to produce across the associated secondary windings two six-phase output voltages each displaced in phase from said three-phase leads by a predetermined phase angle in opposite directions, means conductively connecting the diametrically opposite end connections of each secondary winding to said polyphase leads, a plurality of vapor-electric devices each having a single-phase space current path and anode means and a cathode means, each of said devices having its own individual cathode means, said devices being connected between said direct-current leads and said plurality of pairs of transformers in an interconnected, delta, six phase, triple diametric connection, phase shifting transformers connected between said three-phase power leads and at least one pair of said transformers to shift the output voltages of said pair by a predetermined phase angle to produce across said polyphase leads a voltage having symmetrical phases equal to the number of pairs times twelve and interphase reactance means connected in circuit relation with said secondary windings to permit a plurality of said devices to operate in parallel at all times.

7. An electric power translation system comprising three-phase power leads, direct-current power leads, polyphase power leads, a plurality of pairs of transformers connected between said three-phase power leads and said polyphase power leads, each of the transformers of said pairs comprising an interconnected delta three-phase primary winding connected to said three-phase leads and three secondary windings each having diametrically opposite end connections, said primary windings of each pair being arranged to produce across the associated secondary windings two six-phase output voltages each displaced in phase from said three-phase leads by a predetermined angle in opposite directions, means conductively connecting the diametrically opposite end connections of each secondary winding to said polyphase leads, a plurality of mercury vapor gas tubes each having a single-phase space current path and anode means and a cathode means, each of said tubes having its own individual cathode means, said devices being connected between said direct-current leads and said plurality of pairs of transformers in an interconnected, delta, six phase, triple diametric connection, phase shifting transformers connected between said three-phase power leads and at least two pairs of said transformers to shift the output voltages of each of said pairs, by a predetermined phase angle to produce across said polyphase leads a voltage having symmetrical phases equal to the number of pairs times twelve and interphase reactance means connected in circuit relation with said secondary windings to permit a plurality of said devices to operate in parallel at all times.

8. An electric power translation system comprising three-phase power leads, direct-current power leads, polyphase power leads, a plurality of pairs of transformers connected between said three-phase power leads and said polyphase power leads, each of the transformers of said pairs comprising an interconnected delta, three-phase primary winding connected to said three-phase leads and three secondary windings each having diametrically opposite end connections, said primary windings of each pair being arranged to produce across the associated secondary windings two six-phase output voltages each displaced in phase from said three-phase leads by a predetermined angle in opposite directions, means conductively connecting the diametrically opposite end connections of each secondary winding to said polyphase leads, a plurality of separate, single-phase, semiconductor rectifying devices of a type in which the rating is determined more by the peak current than by the average current carried by each of said devices, said devices being connected between said direct-current leads and said plurality of pairs of transformers in an interconnected, delta, six phase, triple, diametric connection, phase shifting transformers connected between said three-phase power leads and at least two pairs of said transformers to shift the output voltages of said pair by a predetermined phase angle to produce across said polyphase leads a voltage having symmetrical phases equal to the number of pairs of transformers times twelve and interphase reactance means connected in circuit relation with said secondary windings to permit a plurality of said devices to operate in parallel at all times.

9. A polyphase connection for supplying power to a plurality of parallel connected rectifiers comprising a polyphase power circuit, a plurality of transformers each having an interconnected delta, three-phase primary winding connected to said polyphase power circuit and three secondary windings connected in a triple diametric connection to provide a six-phase output voltage, said plurality of transformers being divided into pairs with the interconnected delta primary windings of each pair arranged to shift the output voltage of each transformer in said pair with respect to the voltage of said polyphase circuit by a predetermined phase angle in opposite directions to provide a twelve-phase output voltage from each of said pairs, phase shifting transformer means connected between at least two of the pairs of said plurality of transformers and said polyphase circuit to shift the twelve-phase output voltage of each of the associated pairs by a predetermined phase angle to provide a total output voltage having phases equal to the number of pairs of said transformers in said plurality times twelve, the required phase angle shift of said phase shifting transformer means being reduced by the phase shift introduced by said interconnected delta primary windings of said transformers and interphase reactance means connected in circuit relation with said secondary windings to permit a plurality of said rectifiers to operate in parallel at all times.

10. A polyphase connection for supplying power to a plurality of parallel connected rectifiers comprising a three-phase power circuit, a plurality of pairs of transformers each having a hexagonally delta connected primary winding connected to said three-phase power circuit and three secondary windings connected in a triple diametric connection to said rectifiers to provide a six-phase output voltage, the hexagonally delta connected windings of each pair arranged to rotate the output voltage of each transformer by a phase angle of substantially 15° with respect to said three-phase power circuit in opposite directions to produce a twelve-phase output voltage from each pair, a plurality of phase shifting transformers connected between at least one of said pairs to shift the twelve-phase output voltage of each of the associated pairs by a predetermined phase angle to produce a total output voltage having symmetrical phases equal to the number of said pairs times twelve, the necessary phase angle shift of each of said phase shifting transformers being reduced by the predetermined phase rotation introduced by said hexagonally delta connected primary windings and interphase reactance means connected in circuit relation with said secondary windings to permit a plurality of said rectifiers to operate in parallel at all times.

11. An electric power translation system comprising three-phase power leads, direct-current power leads, a plurality of groups of asymmetrically-conducting devices, a plurality of pairs of transformers each having a hexagonally connected three-phase primary winding connected to said three-phase power leads and three secondary windings associated with said primary winding and connected to said direct current power leads and to a group of said devices to apply a six-phase output voltage thereto, phase shifting transformer means connected between said three-phase power leads and each pair of said transformers to shift the phase of the output voltage of the associated pair of transformers and to increase the number of symmetrical phase voltages applied to said group of devices, the hexagonally connected primary windings of each pair of said transformers being arranged to introduce predetermined phase shifts in opposite directions in the output voltages of the different transformers of each of said pairs to thereby reduce the required phase shift in the associated phase shifting transformer means and interphase reactance means connected in circuit relation with said secondary windings to permit a plurality of said devices to operate in parallel at all times.

12. A transformer adapted for connection between three-phase alternating current power leads and a plurality of asymmetrically-conducting devices of a type in which the rating is determined more by the peak current than by the average current carried by each of said devices comprising a three-phase hexagonally connected primary winding connected to said three-phase power leads, and three secondary windings each having a mid-tap lead and diametrically opposite end connections for providing a six-phase output, said diametrically opposite end connections of said secondary windings being adapted for connection to said plurality of asymmetrically-conducting devices, said hexagonally connected primary winding being arranged to shift the six-phase output of said transformer by a predetermined phase angle.

13. A transformer adapted for connection between three-phase alternating current power leads and a plurality of semiconductor rectifying devices of a type in which the rating is determined more by the peak current than by the average current carried by each of said devices comprising a three-phase hexagonally connected primary winding connected to said three-phase power leads, and three secondary windings each having a mid-tap lead and diametrically opposite end connections for providing a six-phase output, said diametrically opposite end connections of said secondary windings being adapted for connection to said plurality of semiconductor rectifying devices, said hexagonally connected primary winding being arranged to shift the six-phase output of said transformer by a phase angle of substantially 15°.

References Cited in the file of this patent
UNITED STATES PATENTS

| | | |
|---|---|---|
| 2,039,034 | Rose et al. | Apr. 28, 1936 |
| 2,166,900 | Bohn et al. | July 18, 1939 |
| 2,193,585 | Evans | Mar. 12, 1940 |
| 2,602,152 | Storsand | July 1, 1952 |
| 2,714,700 | Johnson | Aug. 2, 1955 |